United States Patent
Morrison et al.

(10) Patent No.: US 10,503,217 B1
(45) Date of Patent: Dec. 10, 2019

(54) CABLE RETENTION MECHANISM

(71) Applicant: Dell Products L.P., Round Rock, TX (US)

(72) Inventors: John Trevor Morrison, Round Rock, TX (US); Jace William Files, Round Rock, TX (US); Chiu-Jung Tsen, Zhubei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/277,662

(22) Filed: Feb. 15, 2019

(51) Int. Cl.
*G06F 1/16* (2006.01)

(52) U.S. Cl.
CPC .......... *G06F 1/1683* (2013.01); *G06F 1/1618* (2013.01); *G06F 1/1681* (2013.01)

(58) Field of Classification Search
CPC ............................. G06F 1/1681; G06F 1/1683
See application file for complete search history.

(56) References Cited

U.S. PATENT DOCUMENTS

| | | | | |
|---|---|---|---|---|
| 2002/0034113 A1* | 3/2002 | Fujii | ...................... | G06F 1/1616 365/202 |
| 2011/0291536 A1* | 12/2011 | Jauvtis | .................. | G06F 1/1681 312/319.2 |
| 2014/0085793 A1* | 3/2014 | Zawacki | ............... | G06F 1/1681 361/679.09 |
| 2016/0091923 A1* | 3/2016 | Morrison | .............. | G06F 1/1616 345/55 |
| 2017/0356225 A1* | 12/2017 | Maatta | ...................... | E05D 1/04 |
| 2017/0356226 A1* | 12/2017 | Maatta | ...................... | E05D 3/12 |

\* cited by examiner

*Primary Examiner* — Adrian S Wilson
(74) *Attorney, Agent, or Firm* — Baker Botts L.L.P.

(57) ABSTRACT

A retention mechanism of a dual-body computing system, including a bracket coupled to a first body of the computing system, the bracket translates along a first direction, wherein a cable assembly is attached the bracket; and springs coupled to the bracket to facilitate translating of the bracket along the first direction, wherein, as the bracket progresses from a first state to a second state based on a positioning of each body of the dual-body computing system, the first and the second springs exert an increasing force on the bracket to maintain a level of tension on the cable assembly; wherein, as the bracket progresses from the second state to the first state based on the positioning of each body of the dual-body computing system, the first and the second springs exert a decreasing force on the bracket to retract the cable within one of the bodies of the computing system.

16 Claims, 7 Drawing Sheets

CABLE RETENTION MECHANISM

BACKGROUND

Field of the Disclosure

The disclosure relates generally to a cable retention mechanism used in information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems can include dual-body (or two-body) computing devices that are pivotable about a hinge between the two bodies. Bundled cabling systems can be used to connect each body of the two-body computing device for communication between each body. The bundled cables are often accommodated within the hinge bridging each body of the dual-body computing device. However, as the size of the bundled cables increases, larger hinges are needed, which can be undesirable.

SUMMARY

Innovative aspects of the subject matter described in this specification may be embodied in an information handling system including a dual-body computing system, wherein each body of the dual-body computing system can pivot about an axis with respect to the other body; a retention mechanism coupled to a first body of the dual-body computing system, the retention mechanism including: a bracket that translates along a first direction; a first and a second spring coupled to the bracket at opposite ends of the bracket to facilitate translating of the bracket along the first direction; and a cable assembly fixedly attached to the first body at a first end of the cable assembly and fixedly attached to the second body at a second, opposite end of the cable assembly, wherein the cable assembly is further fixedly attached to the bracket; wherein, as the bracket progresses from a first state to a second state based on a positioning of each body of the dual-body computing system about the axis with respect to the other body, the first and the second springs exert an increasing force on the bracket to maintain a level of tension on the cable assembly, wherein, as the bracket progresses from the second state to the first state based on the positioning of each body of the dual-body computing system about the axis with respect to the other body, the first and the second springs exert a decreasing force on the bracket to retract the cable within one of the bodies of the dual-body computing system.

These and other embodiments may each optionally include one or more of the following features. For instance, the computing apparatus further includes a sheath with an opening adjacent to the retention mechanism, where the cable assembly is positioned within the opening of the sheath, the sheath located between each body of the dual-body computing system. The sheath further includes a material that is resistant to punctures and tears. Each of the first and the second spring are spiral springs. The retention mechanism is independent of a hinge apparatus of the dual-body computing system that provides the axis at which each body of the dual-body computing system pivots. The retention mechanism further comprises a first and a second stiffener bracket coupled to the first and the second spring respectively, wherein each the first and the second stiffener bracket is coupled to the bracket. The cable assembly includes FPCs. The cable assembly includes coaxial cables.

Innovative aspects of the subject matter described in this specification may be embodied in a retention mechanism of a dual-body computing system, the retention mechanism including a bracket coupled to a first body of the dual-body computing system, the bracket translates along a first direction, wherein a cable assembly is fixedly attached the bracket; and a first and a second spring coupled to the bracket at opposite ends of the bracket to facilitate translating of the bracket along the first direction, wherein, as the bracket progresses from a first state to a second state based on a positioning of each body of the dual-body computing system about an axis with respect to the other body, the first and the second springs exert an increasing force on the bracket to maintain a level of tension on the cable assembly; wherein, as the bracket progresses from the second state to the first state based on the positioning of each body of the dual-body computing system about the axis with respect to the other body, the first and the second springs exert a decreasing force on the bracket to retract the cable within one of the bodies of the dual-body computing system.

These and other embodiments may each optionally include one or more of the following features. For instance, the retention mechanism further includes a sheath with an opening adjacent to the bracket, where the cable assembly is positioned within the opening of the sheath. The sheath further includes a material that is resistant to punctures and tears. Each of the first and the second spring are spiral springs. Each of the first and the second springs are linear springs. Each of the first and the second springs are from a group of springs including torsion, coil, leaf, and compression. The retention mechanism is independent of a hinge apparatus of the dual-body computing system. The retention mechanism further comprises a first and a second stiffener bracket coupled to the first and the second spring respectively, wherein each of the first and the second stiffener brackets are coupled to the bracket.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
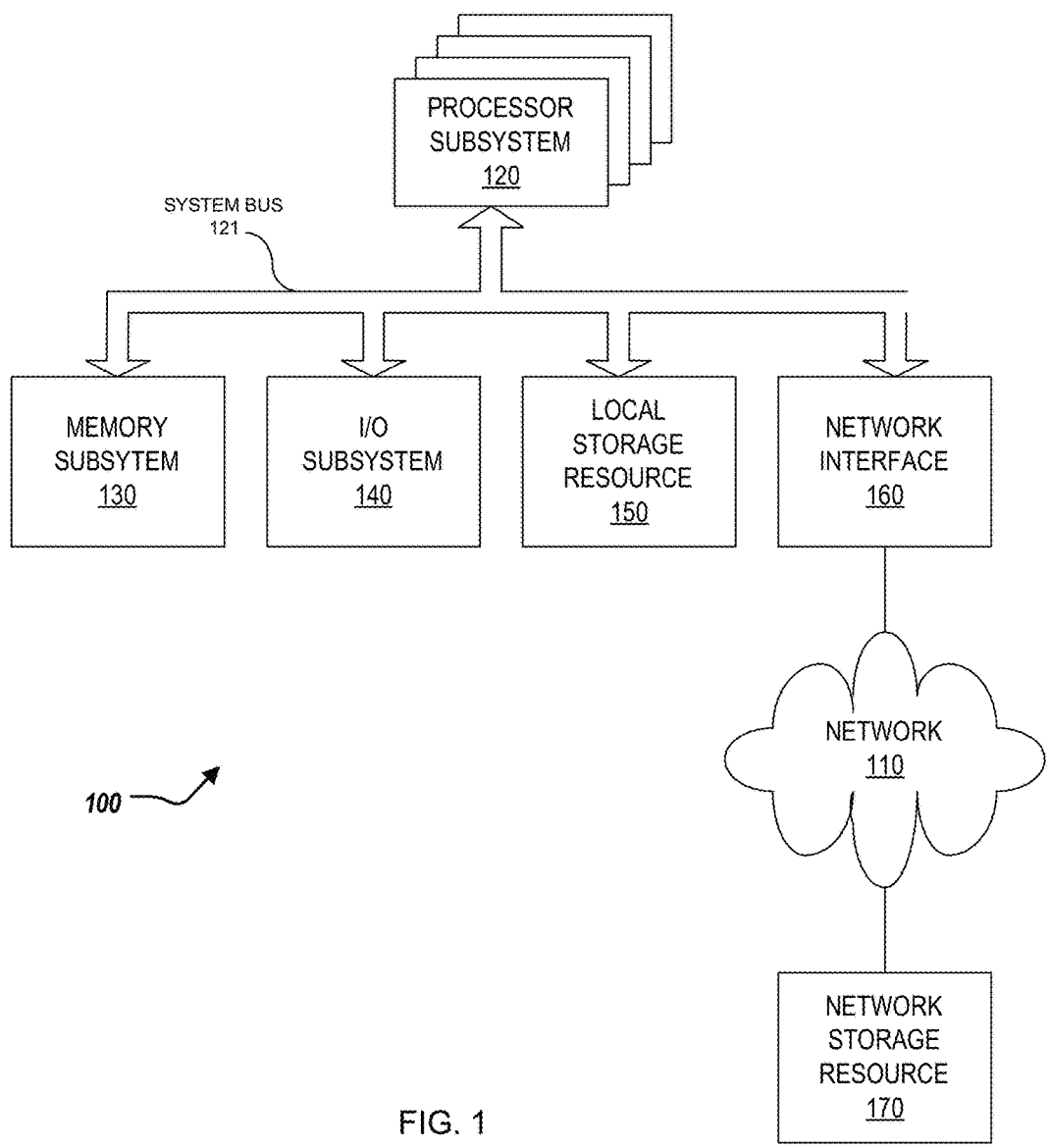
FIG. 1 is a block diagram of selected elements of an embodiment of an information handling system.

This document describes a cable retraction mechanism that connects two bodies of a dual-body computing device. The retention mechanism can include a bracket coupled to a first body of the dual-body computing device, and springs coupled to the bracket at opposite ends of the bracket. A cable assembly is attached to the bracket. The bracket translates along a first direction to provide movement of the cable assembly. As the bracket progresses from a first state of the computing device (e.g., the bodies are at 180-degrees with respect to each other) to a second state (e.g., the bodies are at 0- or 360-degrees with respect to each other), the springs exert an increasing force on the bracket to maintain a level of tension on the cable assembly. Furthermore, as the bracket progresses from the second state back to the first state, the springs exert a decreasing force on the bracket to retract the cable assembly within one of the bodies of the dual-body computing device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2A:
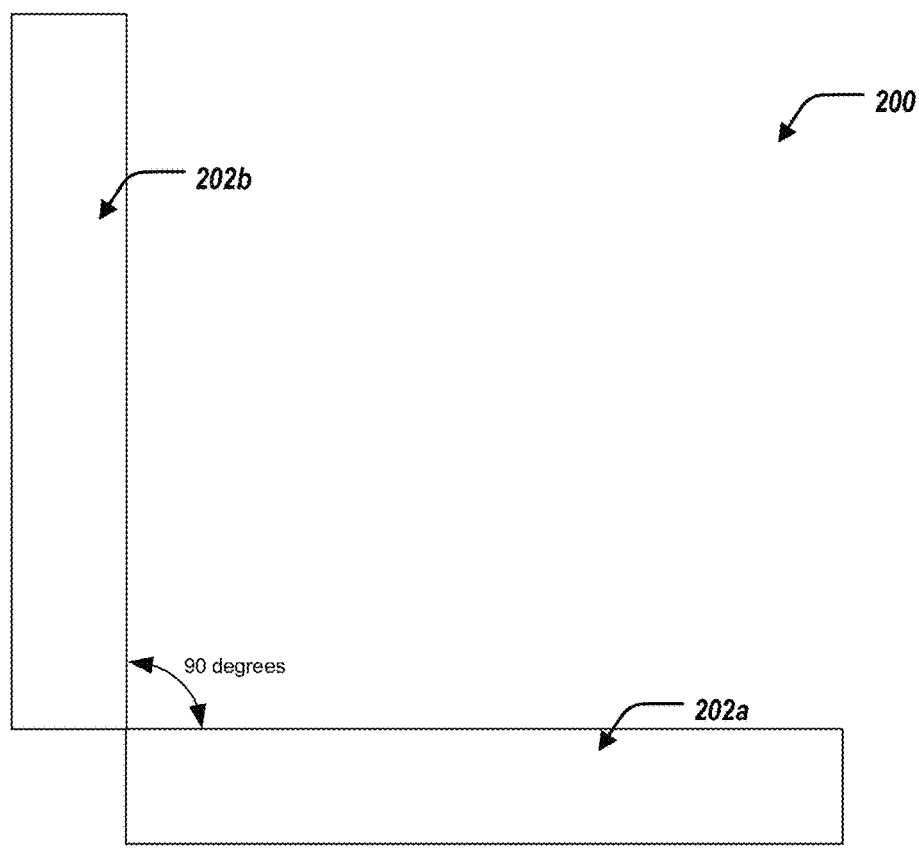
FIGS. 2A-2D illustrate a computing device in various configurations.
Figure 2B:
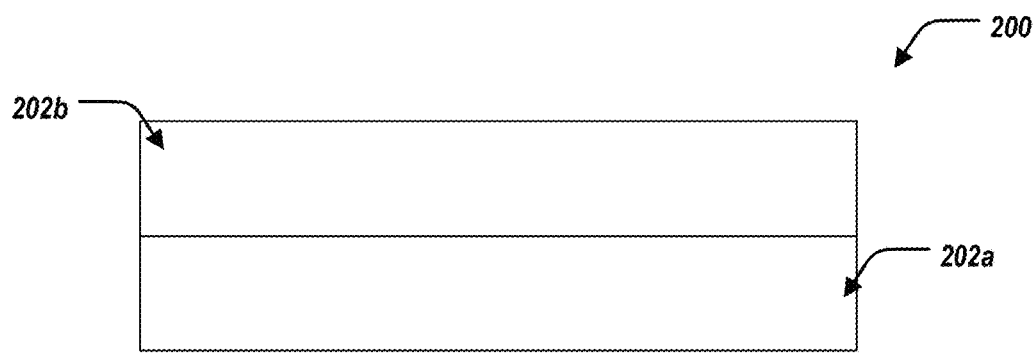
Figure 2C:
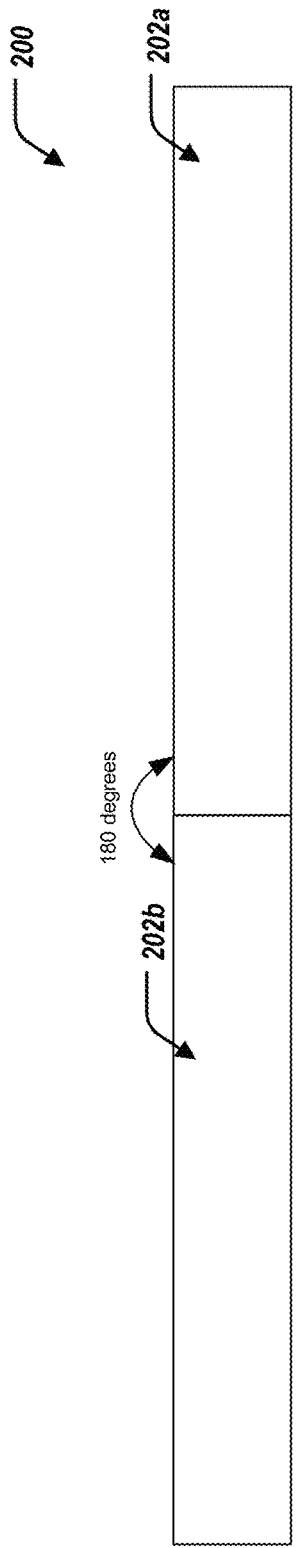
Figure 2D:
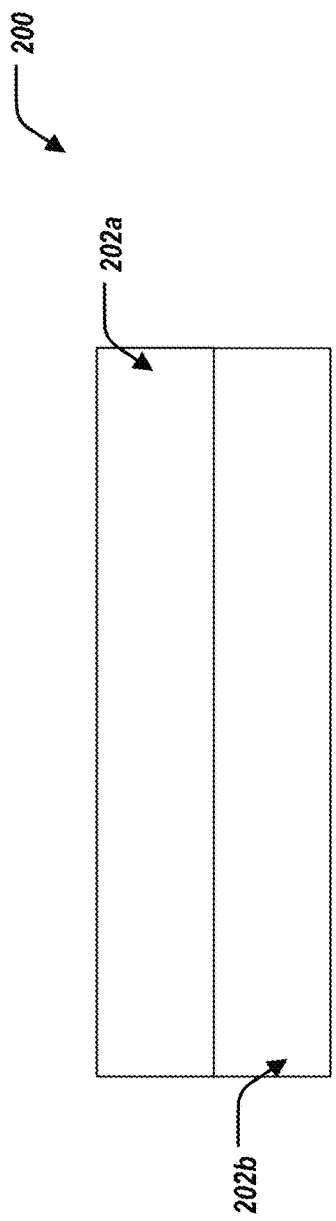

Turning now to FIG. 2A, FIG. 2A depicts a dual-body computing system 200 including a first body 202a and a second body 202b (collectively referred to as bodies 202). The computing system 200 can be similar to the information handling system 100 of FIG. 1. In some examples, the first body 202a, the second body 202b, or both, include a display. In some examples, the computing system 200 is a 2-in-1 tablet-laptop combination computer. The computing system 200 can pivot about an axis provided by a hinge (not shown) that connects the bodies 202. That is, each body 202 can pivot about the axis with respect to the other body 202. As shown in FIG. 2A, the second body 202b is positioned at approximately a 90-degree angle with respect to the first body 202a about the axis 204. However, other positions of the computing system 200 are possible. For example, as shown in FIG. 2B, the second body 202b is positioned at approximately a 0-degree angle with respect to the first body 202a; as shown in FIG. 2C, the second body 202b is positioned at approximately a 180-degree angle with respect to the first body 202a; and as shown in FIG. 2D, the second body 202b is positioned at approximately a 360-degree angle with respect to the first body 202a.

Figure 3A:
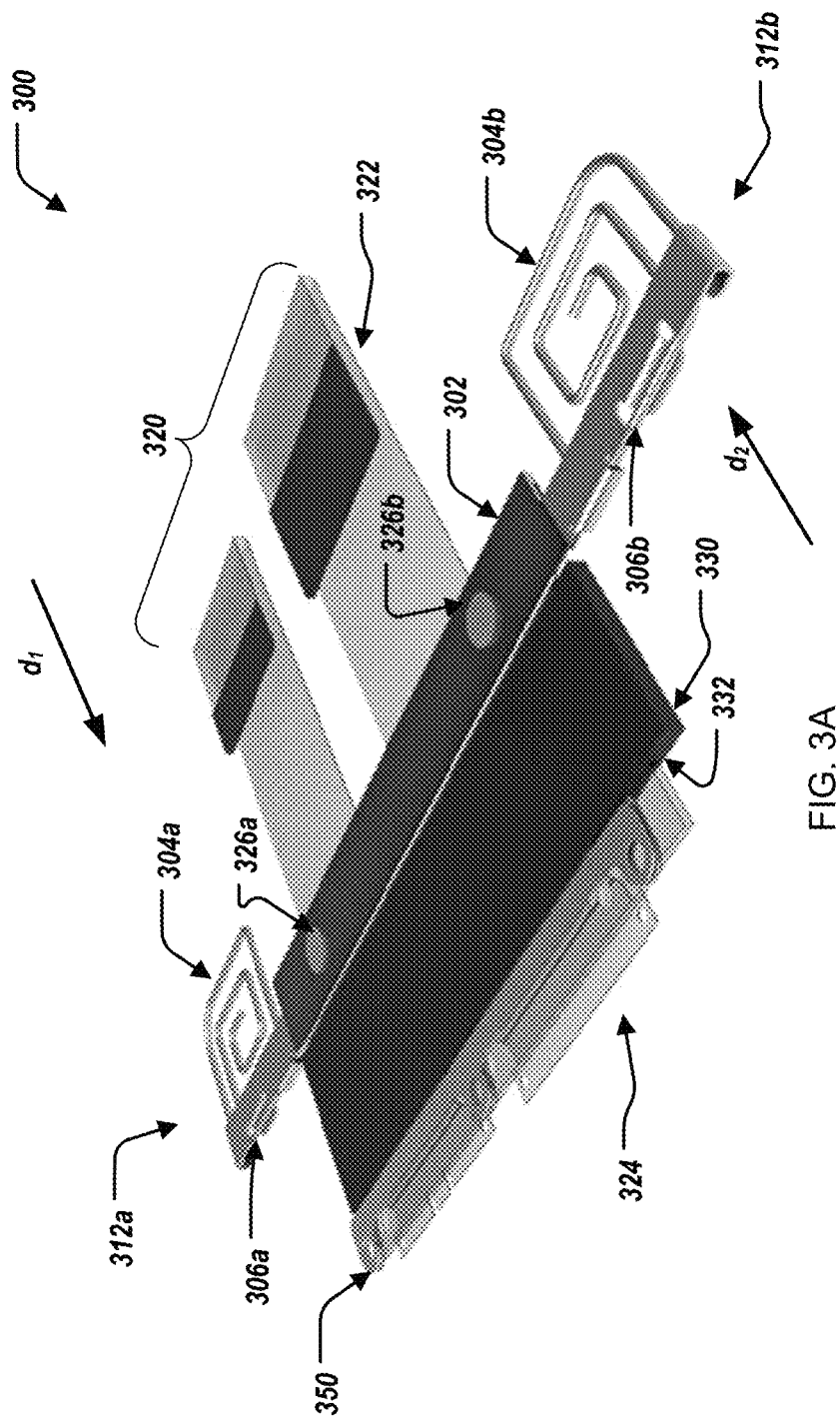
FIG. 3A illustrates a retention mechanism in a first state.

FIG. 3A illustrates a retention mechanism 300 of the computing system 200 in a first state. Specifically, the retention mechanism 300 is coupled to the first body 202a of the computing system 200. In short, the retention mechanism 300 connects the bodies 202 of the computing system 200 such that the bodies 202 are able to pivot about the axis from 0-degrees (FIG. 2B) to 180-degrees (FIG. 2C) to 360-degrees (FIG. 2D), and vice versa. The retention mechanism 300 facilitates translation (expansion and retraction) of a cable assembly of the computing system 200 based on the positioning of the bodies 202, described further herein.

The retention mechanism 300 can include a bracket 302, a first spring 304a and a second spring 304b (collectively referred to as springs 304), and a first stiffener bracket 306a and a second stiffener bracket 306b (collectively referred to as stiffener brackets 306). The springs 304 are coupled to the bracket 302 at opposite ends of the bracket 302—e.g., the first spring 304a is coupled to a first end 312a of the bracket 302 and the second spring 304b is coupled to a second end 312b of the bracket 302. The first stiffener bracket 306a is coupled between the bracket 302 and the first spring 304a, and the second stiffener bracket 306b is coupled between the bracket 302 and the second spring 304b.

In some examples, the bracket 302 can be coupled to the first body 202a. Specifically, the stiffener brackets 306 and/or the springs 304 of the bracket 302 can be coupled to the first body 202a. However, in some examples, the retention mechanism can be "free-floating" within the first body 202a (e.g., not fixedly coupled to the first body 202a).

To that end, the retention mechanism 300 can facilitate movement of a cable assembly 320 within the computing system 200, and in particular, between the bodies 202 of the computing system 200. The cable assembly 320 can be coupled, or fixedly attached to the first body 202*a* at a first end 322 of the cable assembly 320; and can be coupled, or fixedly attached to the second body 202*b* at a second end 324 of cable assembly 320. Furthermore, the cable assembly 320 can be fixedly attached to the bracket 302 at points 326*a*, 326*b* (collectively referred to as points 326). In some examples, a portion of the cable assembly 320 can be positioned within a sheath 330, and in particular, an opening 332 of the sheath 330. The sheath 330 is positioned adjacent to the retention mechanism 300 and is located between each body 202 of the computing system 200. In some examples, the sheath 330 can be coupled to the bracket 302. In some examples, the sheath 330 and/or the cable assembly 320 is further coupled to a secondary bracket 350 that can be coupled to the second body 202*b*.

The retention mechanism 300 is independent of the hinge (not shown) of the computing system 200 that provides the axis at which each body 202 of the computing system 200 pivots. That is, the retention mechanism 300 facilities movement of the cable assembly 320 within the computing system 200 and between the bodies 202 independent of the hinge that provides the movement of the bodies 202 about the axis.

To facilitate movement of the cable assembly 320 within the computing system 200, and in particular, between the bodies 202 of the computing system 200, the bracket 302 is able to translate along a first direction $d_1$. As the bracket 302 translates along the first direction $d_1$, the cable assembly 320 additionally translates along the first direction $d_1$ as a result of the cable assembly 320 being coupled to the bracket 302 at points 326. Specifically, the bodies 202 of the computing system 200 can be in a first state—that is, the second body 202*b* is positioned approximately at a 180-degree angle with respect to the first body 202*a*, as shown in FIG. 2C. Thus, as the computing system 200 is in a first state, the retention mechanism 300 is also in the first state.

Figure 3B:
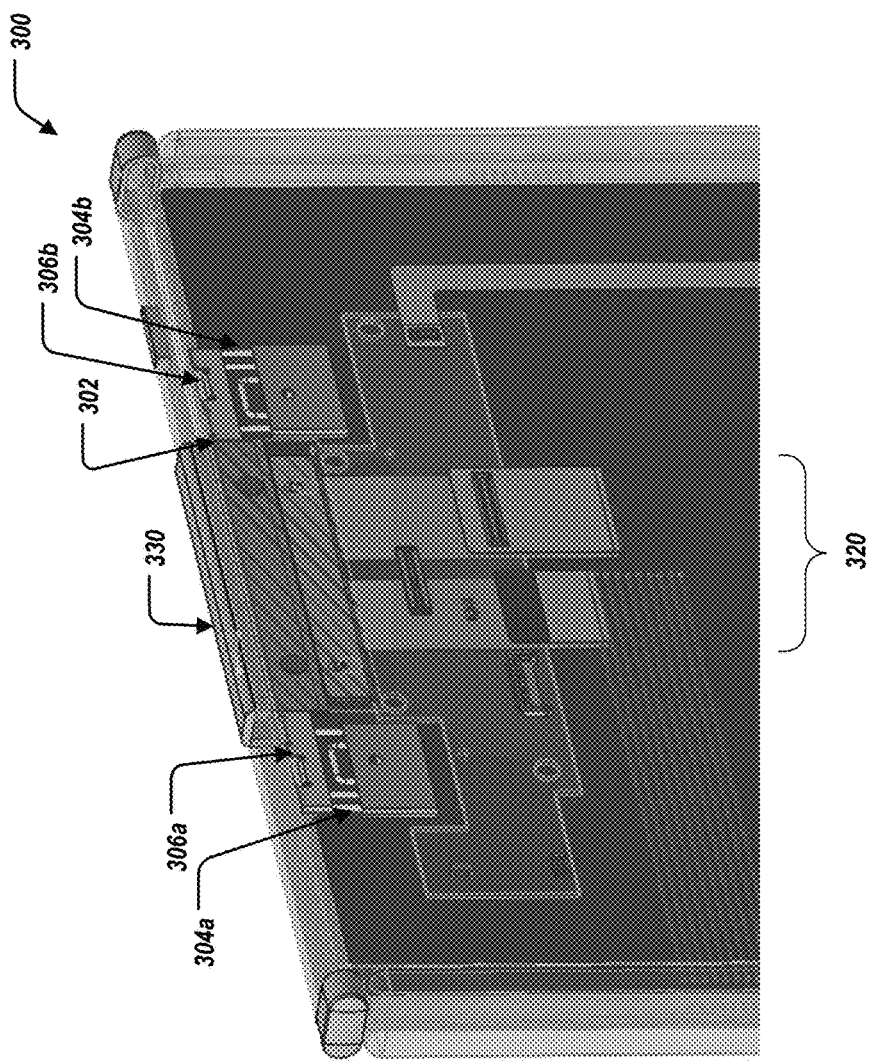
FIG. 3B illustrates the retention mechanism in a second state.

The bodies 202 of the computing system 200 can adjust to a second state—that is, the second body 202*b* is positioned approximately at a 0-degree angle with respect to the first body 202*a*, as shown in FIG. 2B, or the second body 202*b* is positioned approximately at a 360-degree angle with respect to the first body 202*a*, as shown in FIG. 2D. Thus, as the computing system 200 progresses from the first state to the second state, the retention mechanism 300, and the bracket 302, progresses from the first state to the second state based on the positioning of each body 202 about the axis with respect to the other body 202, as shown in FIG. 3B.

To that end, as the retention mechanism 300, and the bracket 302, progress from the first state to the second state, the bracket 302, and the cable assembly 320 translates along the first direction $d_1$. The springs 304 facilitate translation of the bracket 302 along the first direction $d_1$. Specifically, as the bracket 302 progresses from the first state to the second state and translates along the first direction $d_1$, the springs 302 exert an increasing force on the bracket 302 to maintain a level of tension on the cable assembly 320. In some examples, as the bracket 302 progresses from the first state to the second state and translates along the first direction $d_1$, the retention mechanism 300 further provides that such movement of the cable assembly 320 is stable and does not bind.

Figure 4A:
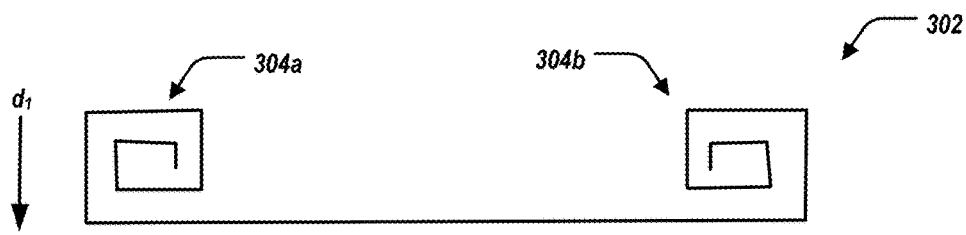
FIGS. 4A, 4B illustrates a bracket of the retention mechanism in the first state, second state, respectively.
Figure 4B:
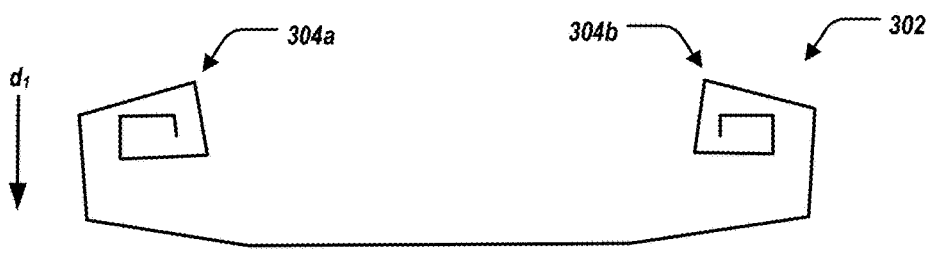

FIG. 4A illustrates the bracket 302 in the first state. Specifically, at the first state, the bracket 302 is "unflexed" and has not translated in the first direction $d_1$. FIG. 4B illustrates the bracket 302 in the second state. Specifically, at the second state, the bracket 302 is "flexed" and has translated in the first direction $d_1$. The springs 304 have adjusted a shape thereof such that the geometry of the springs 304 has accommodated such translation of the bracket 302 in the first direction $d_1$. That is, the springs 304 can adjust a shape thereof to facilitate translation of the bracket 302 along the first direction $d_1$.

Figure 5:
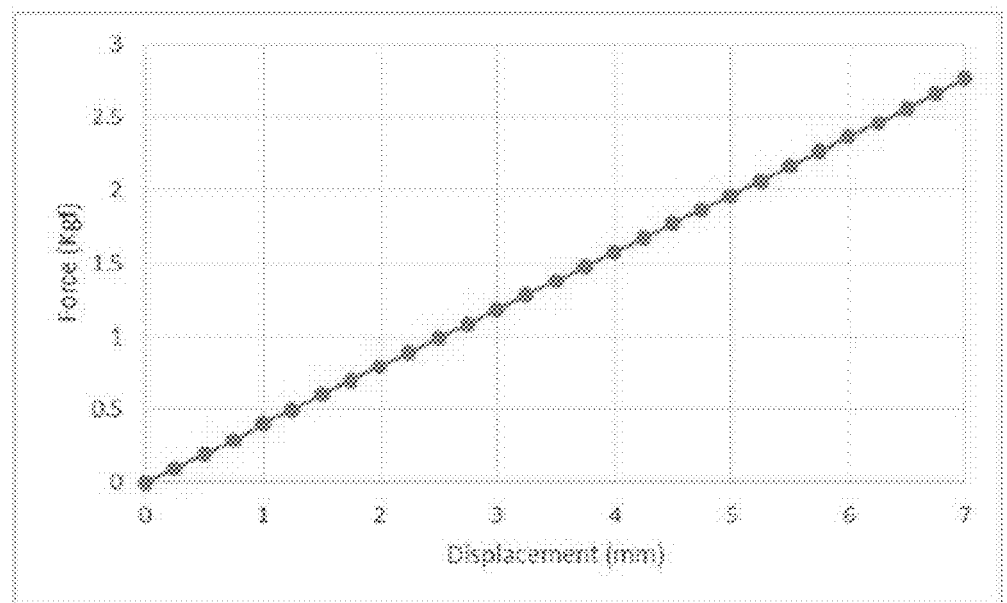
FIG. 5 illustrates a graph of translation of the bracket with respect to a force applied by a spring of the retention mechanism.

FIG. 5 illustrates a graph 500 of the displacement (or translation) of the bracket 302 along the first direction $d_1$ as a function of a force applied by the springs 304 to the bracket 302. Specifically, the x-axis displays the displacement (or translation) of the bracket 302 in millimeters; and the y-axis displays the force applied by the springs 304 to the bracket 302 and/or the cable assembly 320 in kilogram-force (kgt). Thus, the springs 302 exert an increasing force on the bracket 302 as the bracket 302 translates along the first direction $d_1$ to maintain a desired level of tensions on the cable assembly 320.

Referring back to FIGS. 3A, 3B, additionally, as the retention mechanism 300, and the bracket 302, progress from the second state to the first state, the bracket 302, and the cable assembly 320 can translate along a second direction $d_2$, opposite to that of the first direction $d_1$. The springs 304 facilitate translation of the bracket 302 along the second direction $d_2$. Specifically, as the bracket 302 progresses from the second state to the first state and translates along the second direction $d_2$, the springs 302 exert a decreasing force on the bracket 302 to retract the cable assembly 320 within the first body 202*a*. In other words, the springs 304 "take up the slack" of the cable assembly 320 such that the cable assembly 320 is retracted within the first body 202*a*. In some examples, the cable assembly 320 can be retracted into the first body 302*a*, the second body 302*b*, or both. In some examples, when the retention mechanism 300 is "free floating"—e.g., not fixedly coupled to the first body 202*a*—the cable assembly 320 can be retracted into both of the bodies 302. That is, the retention mechanism 300 can facilitate movement of the cable assembly 320 within the computing system 200, and in particular, between the bodies 202 of the computing system 200 such that the cable assembly 320 can translate along the directions $d_1$ and $d_2$ (e.g., concurrently) as the computing system 200 progresses between the first and the second states. In short, the retention mechanism 300 can allow movement of the cable assembly 320 into either of the bodies 302.

In some examples, the springs 304 provide a self-aligning force to the bracket 302 and the cable assembly 320 to facilitate centering of the cable assembly 320, e.g., between the bodies 302. In some examples, the springs 304 are spiral springs, as illustrated in FIGS. 3A and 3B, and as a result, can facilitate self-balance of the load across the bracket 302. In some examples, the springs 304 are linear springs. In some examples, the springs 304 are torsion, coil, leaf, or compression springs.

In some examples, the stiffener brackets 306 provide additional strength to the bracket 302 and/or the springs 304. Specifically, as the computing device 200 is cycled between the first state and the second state, the stiffener brackets 306 minimize, if not prevent, racking of the cable assembly 320 during such cycling.

Figure 6:
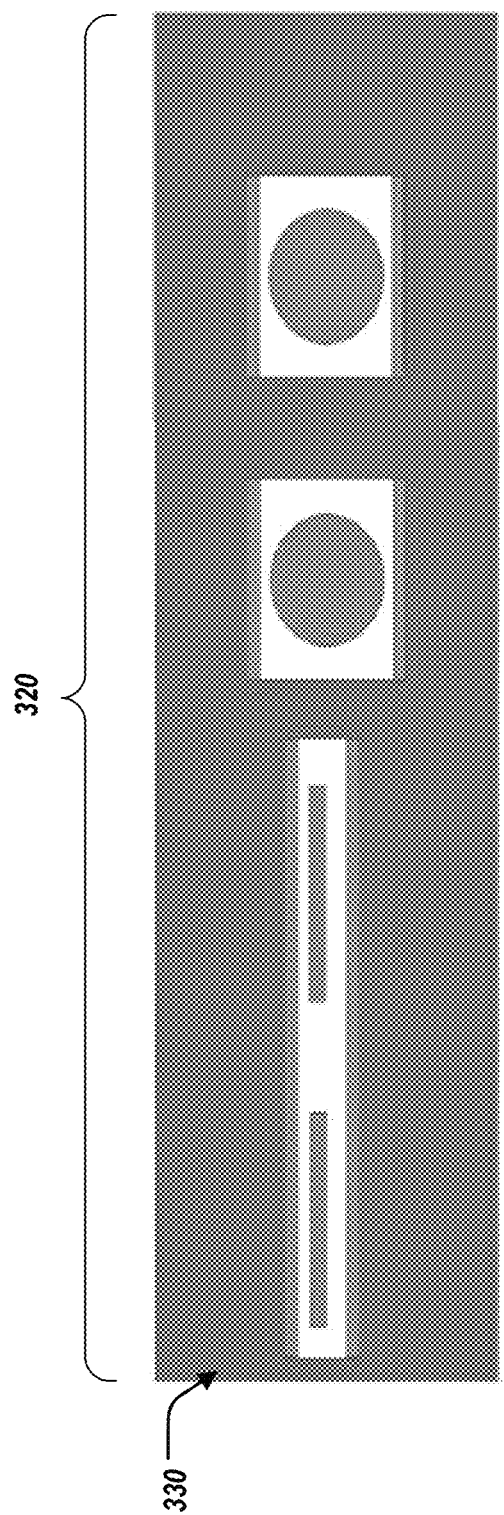
FIG. 6 illustrates a cross-section of a cable assembly and a sheath.

FIG. 6 illustrates a cross-section of the cable assembly (or cable interconnect) 320 and the sheath 330. The cable assembly 320 can include flexible printed circuits (FPC), coaxial cables, or any type of desired cable connecting the bodies 202 of the computing system 200. The sheath 330 can include a material that is resistant to punctures and/or tears. The sheath 330 can be made of a cosmetic flexible material that is able to flex from 0-degrees (e.g., the computing system 200 as shown in FIG. 2B) to 180-degrees (e.g., the computing system 200 as shown in FIG. 2C) to 360-degrees (e.g., the computing system 200 as shown in FIG. 2D), and vice versa. The sheath 330 can include Kevlar, carbon fiber, or other materials to protect the cable assembly 320 (e.g., minimize punctures and/or tears of the cable assembly 320). The sheath 330 can facilitate routing of the cable assembly 320 between the bodies 202 of the computing device 200. In some examples, the cable assembly 320 can include an electro-mechanical flex member that provides electrical conductivity and mechanical strength/tension.

In some examples, the retention mechanism 300 is minimized in height in a direction orthogonal to the first and the second directions (e.g., minimized in height in the "z-direction"). For example, the height of the retention mechanism 300 can be 6 millimeters or less.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An information handling system comprising:
    a dual-body computing system, wherein each body of the dual-body computing system can pivot about an axis with respect to the other body;
    a retention mechanism coupled to a first body of the dual-body computing system, the retention mechanism including:
        a bracket that translates along a first direction;
        a first and a second spring coupled to the bracket at opposite ends of the bracket to facilitate translating of the bracket along the first direction; and
        a cable assembly fixedly attached to the first body at a first end of the cable assembly and fixedly attached to the second body at a second, opposite end of the cable assembly, wherein the cable assembly is further fixedly attached to the bracket;
    wherein, as the bracket progresses from a first state to a second state based on a positioning of each body of the dual-body computing system about the axis with respect to the other body, the first and the second springs exert an increasing force on the bracket to maintain a level of tension on the cable assembly,
    wherein, as the bracket progresses from the second state to the first state based on the positioning of each body of the dual-body computing system about the axis with respect to the other body, the first and the second springs exert a decreasing force on the bracket to retract the cable within one of the bodies of the dual-body computing system.

2. The information handling system of claim 1, further comprising a sheath with an opening adjacent to the retention mechanism, where the cable assembly is positioned within the opening of the sheath, the sheath located between each body of the dual-body computing system.

3. The information handling system of claim 2, wherein the sheath further includes a material that is resistant to punctures and tears.

4. The information handling system of claim 1, wherein each of the first and the second spring are spiral springs.

5. The information handling system of claim 1, wherein the retention mechanism is independent of a hinge apparatus of the dual-body computing system that provides the axis at which each body of the dual-body computing system pivots.

6. The information handling system of claim 1, wherein the retention mechanism further comprises a first and a second stiffener bracket coupled to the first and the second spring respectively, wherein each the first and the second stiffener bracket is coupled to the bracket.

7. The information handling system of claim 1, wherein the cable assembly includes FPCs.

8. The information handling system of claim 1, wherein the cable assembly includes coaxial cables.

9. A retention mechanism of a dual-body computing system, comprising:
    a bracket coupled to a first body of the dual-body computing system, the bracket translates along a first direction, wherein a cable assembly is fixedly attached the bracket; and
    a first and a second spring coupled to the bracket at opposite ends of the bracket to facilitate translating of the bracket along the first direction,
    wherein, as the bracket progresses from a first state to a second state based on a positioning of each body of the dual-body computing system about an axis with respect to the other body, the first and the second springs exert an increasing force on the bracket to maintain a level of tension on the cable assembly;
    wherein, as the bracket progresses from the second state to the first state based on the positioning of each body of the dual-body computing system about the axis with respect to the other body, the first and the second springs exert a decreasing force on the bracket to retract the cable within one of the bodies of the dual-body computing system.

10. The retention mechanism of claim 9, further comprising a sheath with an opening adjacent to the bracket, where the cable assembly is positioned within the opening of the sheath.

11. The retention mechanism of claim 10, wherein the sheath further includes a material that is resistant to punctures and tears.

12. The retention mechanism of claim 9, wherein each of the first and the second spring are spiral springs.

13. The retention mechanism of claim 9, wherein each of the first and the second springs are linear springs.

14. The retention mechanism of claim 9, wherein each of the first and the second springs are from a group of springs including torsion, coil, leaf, and compression.

15. The retention mechanism of claim 9, wherein the retention mechanism is independent of a hinge apparatus of the dual-body computing system.

16. The retention mechanism of claim 9, wherein the retention mechanism further comprises a first and a second stiffener bracket coupled to the first and the second spring respectively, wherein each of the first and the second stiffener brackets are coupled to the bracket.

\* \* \* \* \*